3,479,107
APPARATUS FOR SCANNING AN AREA WITH AN OSCILLATORY SCANNING ELEMENT
Richard Blythe and Edgar A. Work, Jr., Ann Arbor, Mich., assignors to The Bendix Corporation, a corporation of Delaware
Filed Dec. 15, 1966, Ser. No. 603,402
Int. Cl. G02b 17/06
U.S. Cl. 350—6   5 Claims

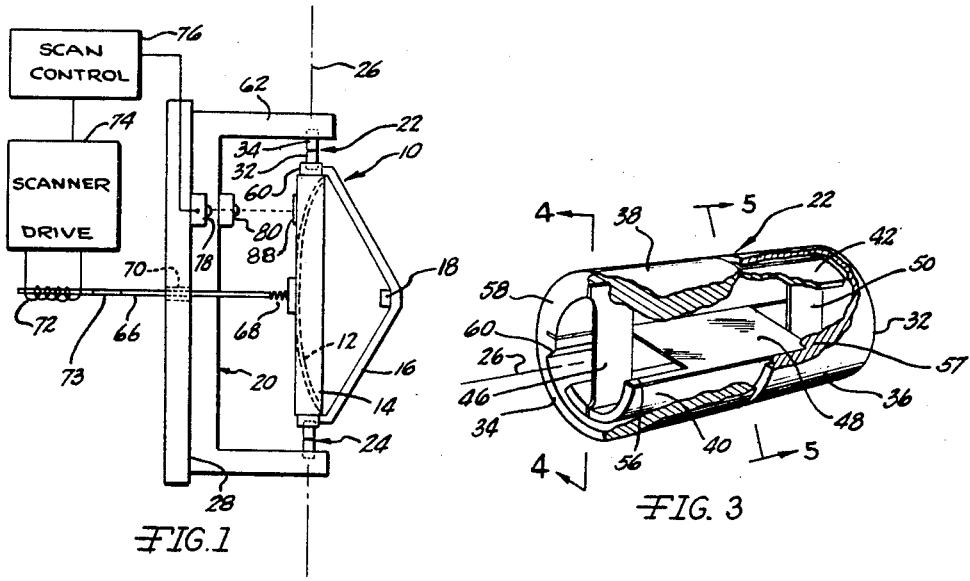
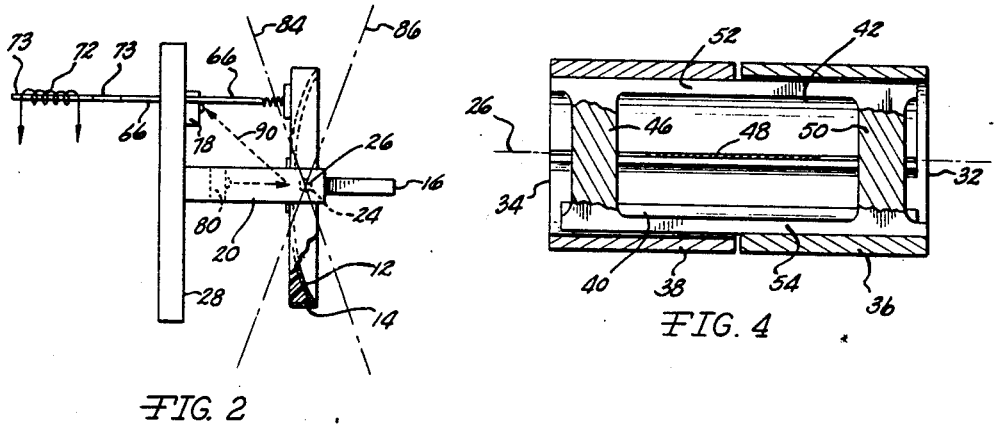
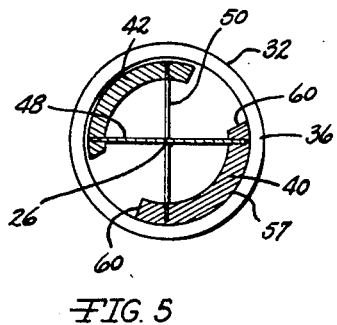
Nov. 18, 1969 — R. BLYTHE ET AL — 3,479,107
APPARATUS FOR SCANNING AN AREA WITH AN OSCILLATORY SCANNING ELEMENT
Filed Dec. 15, 1966
INVENTOR
RICHARD BLYTHE
EDGAR A. WORK JR.
ATTORNEY United States Patent Office 3,479,107
Patented Nov. 18, 1969

ABSTRACT OF THE DISCLOSURE

A radiation scanning apparatus including a pivotally mounted and spring driven radiation scanning element activated by a drive means imparting oscillatory movement to the element and having a flexible coupling device connecting the driving means to the scanning element.

---

This invention relates generally to radiation scanners and more particularly to an apparatus for supporting a scanning element.

One type of radiation scanning apparatus employs an oscillating element such as a mirror or a reflector that causes a radiation beam to move along a predetermined scanning pattern. Although the scanning element is generally a passive radiation element such as a reflector, a mirror, a lens or the like, in certain applications the scanning element may be an active element that is either radiating or receiving radiation directly. Such active elements include feed horns and other antennas as well as infrared detectors and other types of sensors. Where conventional bearings are used to support the scanning element, lubrication is required. The bearings have relatively high frictional losses and the scanner is subject to the usual mechanical failures incident to moving parts of the bearings. Possible mechanical failures are particularly undesirable when the scanner is used in space applications that require reliable operation for time periods of a year or more such as with synchronous orbiting satellites or with deep space probes. Thus it is desirable to minimize the likelihood of mechanical failures in certain radiation scanners. It is also desirable in many scanning applications, particularly in space applications, to reduce the frictional losses and thus reduce the power requirements of the scanner drive.

The objects of the present invention are to provide an improved radiation scanning apparatus that is reliable and has relatively low power consumption.

Other objects of the present invention are to provide a support for a radiation scanning element that is not subject to mechanical failure when used over extended periods of time and over wide ranges of environmental conditions; that achieves effective pivotal support of the scanning element without sliding or rolling friction and does not require lubrication; and that provides a driving function in addition to a support function by imparting to the scanning element, oscillation at a natural frequency which can be synchronized to a desired scanning rate to minimize power consumption of the scanner drive.

Other objects, features and advantages of the present invention will become apparent in connection with the following description, the appended claims and the accompanying drawings in which:

FIGURE 1 is a top view of a radiation scanner having flexural pivots supporting a scanning element in accordance with the present invention and further illustrating in block form the circuit of the drive for the scanner;

FIGURE 2 is a side view of the mechanical portion of the scanner illustrated in FIG. 1;

FIGURE 3 is a perspective view of a flexural pivot, partly broken away and in section, which pivotally supports the scanning element in accordance with the present invention;

FIGURE 4 is a longitudinal section taken on line 4—4 of FIG. 3; and

FIGURE 5 is a transverse section taken on line 5—5 of FIG. 3.

The scanner of the present invention which is illustrated in FIGS. 1 and 2 generally comprises a scanning element 10 which includes a concave mirror 12 mounted in a frame 14. A spider 16 rigidly fastened on the frame 14 projects outwardly and forwardly from the mirror 12 and carries an infrared detector 18 which is located at the focus of mirror 12 in a conventional manner. Mirror 12 is a parabolic mirror to focus parallel rays at the detector 18. The scanning element 10 is mounted on a yoke 20 by a pair of flexural pivots 22, 24 for limited angular oscillations about a horizontal axis 26. The yoke 20 in turn is fastened on a flat vertical base plate 28.

The two pivots 22, 24 are substantially identical in construction and in the manner in which they are attached to the frame 14 and to the yoke 20 so that only one of the pivots will be described in detail in conjunction with FIGS. 3–5. The pivot 22 generally comprises a pair of sleeves 32, 34 which are nested in axial alignment on the pivot axis 26. Each sleeve 32, 34 has a tubular portion 36, 38, respectively, each of which has a respective axial extension 40, 42 that is telescoped concentrically into the tubular portion of the other sleeve. Each extension 40, 42 has a transverse cross section in the form of an annular sector having an effective diameter such that the sleeves 32, 34 are free for limited relative rotation about the axis 26. The sleeves 32, 34 are supported on each other by three flat spring members 46, 48, 50 arranged on the pivot 22 to flex about the axis 26 and maintain the sleeves in axial and concentric alignment during relative rotation about the axis 26. The spring 46 is fastened at one end to the extension 40 and extends diametrically across the sleeves 32, 34 with the other end being fastened to the tubular portion 38. The spring 48 is fastened at one end to the sleeve 32 and extends diametrically across the sleeves at ninety degrees to the springs 46, 50 with its opposite end being fastened to the sleeve 34. The third spring 50 is fastened between the extension 42 and the tubular portion 36 to extend diametrically across the sleeves parallel to spring 46.

In the particular construction illustrated in FIGS. 3–5, the springs 46, 50 are joined by two thin webs 52, 54 so that the springs can be fabricated and assembled to the sleeves 32, 34 in one piece. The webs 52, 54 are disposed in longitudinal slots in the sleeves 32, 34 and secured in place by high temperature alloy brazing. The spring 48 has laterally projecting arms 56 disposed in slots in the sleeves 32, 34 and the spring 48 is also secured in place by high temperature alloy brazing. Untempered springs may be brazed to the sleeves and then the assembled unit subjected to heat treating to temper the springs 46, 48, 50. In the illustrated embodiment each tubular portion 36, 38 has a thick wall portion 57, 58, respectively, that is formed as a continuation of the respective extension 40, 42. Each wall portion 57, 58 has two generally radial shoulders 60 that serve as stops by engaging the extension 40 or 42 on the other sleeve to limit relative rotation of the sleeves. The wall portions 57, 58 also facilitate mounting the springs 46, 48, 50 on the sleeves 32, 34.

One of the sleeves, for example, sleeve 32 is non-rotatably fastened in a boss 60 on the scanning element frame 14. In the preferred construction the tubular portion 36 is press fitted in the boss 60 and the boss is split to limit compression on the sleeve. The other sleeve 34 is nonrotatably fastened on one arm 62 of the yoke 20 as by means of a press fit. With this construction the springs 46, 48, 50 will yieldably restrain initial rotation of the element 10 about the axis 26. However, when the element 10 is initially displaced about the axis 26 against the spring action of the springs 46, 48, 50, the springs will return the element beyond its initial at rest position and impart oscillatory motion to the element. The springs 46, 48, 50 maintain concentricity and alignment of the sleeves 32, 34 and thus maintain element 10 properly positioned on the axis 26 during motion of the element. There is no sliding or rolling friction in the pivots 22, 24 accompanying motion of the element 10. In general the design parameters of the pivots 22, 24 can be chosen such that when the pivots are loaded by the scanning element 10 and the element is initially set in motion, the pivots serve as spring motors that oscillate the element at a natural frequency corresponding to a desired scanning rate depending on the particular scanning application.

Although a particular arrangement for driving the scanning element 10 is not an essential feature of the present invention, in the illustrated scanner (FIG. 1) an arm 66 is fastened at one end to the frame 14 above the pivot axis 26 by means of a stiff helical spring 68. Arm 66 extends rearwardly from the scanning element 10 through a guide 70 in the base plate 28 and the arm projects rearwardly from the plate 28 to be received in a solenoid 72. Arm 66 has a segment 73 of magnetic material disposed in solenoid 72 so that when solenoid 72 is energized the arm 66 shifts longitudinally, from right to left, as viewed in FIGS. 1 and 2 to impart initial pivotal motion to the scanning element 10 about the axis 26. Spring 68 serves as a flexible coupling so that the arm 66 can shift generally rectilinearly while the scanning element 10 pivots about the axis 26 without breaking the arm. Solenoid 72 is driven by a scanner drive circuit 74 which in turn is controlled by a scan control circuit 76 Reference signals for the scan control 76 are provided by a photocell 78 which is fastened on the plate 28 above the axis 26. The photocell 78 is disposed to receive reflected light from a pencil beam light source 80 once during each oscillation of the element 10 as long as the oscillation amplitude is above minimum angular limits designated by lines 84, 86. A reflective strip 88 may be fastened on the rear of the element 10 to reflect the light beam from source 80.

In operation of the scanner illustrated in FIGS. 1 and 2, the element 10 is initially set into oscillation by pulsing solenoid 72 and element 10 oscillates about axis 26 beyond the minimum limits 84, 86 due to the spring motor action of pivots 22, 24. The oscillatory motion of the mirror 14 causes an infrared radiation beam to be scanned over a limited angular scanning pattern with detector 18 providing an electrical output in a conventional manner. Each time the scanning element 10 pivots in a clockwise direction as viewed in FIG. 2 across the limit 86, light from source 80 is reflected onto the photocell 78 as illustrated by the dashed line 90 to indicate that the scanning amplitude is above a prescribed minimum amplitude. So long as the element 10 is oscillating above its minimum amplitude, photocell 78 will be actuated during each scanning cycle. When the oscillation amplitude drops below the limits 84, 86, photocell 78 will not be actuated to provide an indication to the scan control 76 which in turn actuates the drive circuit 74 to impart additional motion to element 10 that is required to maintain oscillation above the minimum amplitude. After the oscillations exceed the minimum amplitude, photocell 78 will again be actuated during each scanning cycle and the scanning element 10 will oscillate about the axis 26 due to the spring motor action of pivots 22, 24. Thus the scanner drive 74 operates intermittently each time the scanning amplitude damps out to below the minimum scanning limits to maintain oscillation above the minimum amplitude.

The scanner described hereinabove and in particular the use of the flexural pivots 22, 24 to support the scanning element 10 with the pivots also serving as spring motors to maintain oscillation of the scanning element 10, provides an ideal solution to problems associated with more conventional type bearings when used in a space environment. The flexural pivots 22, 24 have no sliding or rolling friction, and only low internal frictional losses so that no lubrication is required and power consumption to maintain oscillation of the scanning element 10 is low. The flexural pivots 22, 24 have practically unlimited life and are not affected by radiation and environmental conditions which might vary over wide ranges. In space the scanning element 10 will essentially be weightless and sustained oscillation can be achieved by the spring motor action of the pivots 22, 24 after the scanning element 10 is initially set in motion by the drive circuit 74 and the arm 66. Only intermittent operation of the drive circuit 74 is required to maintain oscillations of the scanning element 10 above the minimum scanning limits 84, 86.

Although the scanning element 10 has been disclosed as including a mirror 12 for use with an infrared detector 18, flexural pivots 22, 24 to support and drive a scanning element together with the intermittent operation of the drive circuit 74, can also be used with reflectors and lenses as well as with active radiation elements, either receiving or transmitting elements, such as feed horns, dipole antennas which are scanned directly. Although the infrared detector 18 moves with the scanning element 10 in the apparatus illustrated in FIG. 1, the present invention is also useful in scanning apparatus where the active element, either transmitting or receiving element, does not move. Conventional optics can be used to transfer radiation between a stationary active element and the scanning element.

The particular natural frequency of oscillation for the pivots 22, 24 when loaded, can be chosen for a given mass and mass distribution of the scanning element 10 to achieve the desired scanning rate. By way of example the natural frequency depends on the modulus of elasticity of the material in springs 46, 48, 50 and on the width, thickness and length of the springs. In the preferred embodiment the springs are made of stainless steel to provide high fatigue strength and therefore the modulus of elasticity is relatively fixed. Similarly the length and width of the springs for a particular application are dictated primarily by spatial limitations for the flexural pivots. Thus the thickness of the springs 46, 48, 50 can serve as the principal parameter for determining the natural frequency of oscillation and thus the scanning rate. The natural frequency of oscillation will vary in accordance with the cube of the thickness of the springs 46, 48, 50 and thus the oscillation rate may be varied considerably by slight increases or decreases in the spring thickness. Varying the thickness of the springs is also an economical modification to achieve different scanning rates since only minor manufacturing changes are required whereas other variations in the pivots 22, 24 or in the mass or the mass distribution of the scanning element 10 could not be achieved as economically. With a flexural pivot constructed as described above in connection with FIGS. 3–5 an oscillation amplitude of ±30° can be achieved. For an angular travel of ±30° maximum the scanning element can be operated effectively at angular travels of 10° through 20° with long fatigue life; relatively linear scanning; and sustained oscillations due to the spring action of the pivots 22, 24. By way of further example a scanning mirror in an infrared sensor was operated at four cycles per second to achieve a rectilinear scan for sensing the horizon of the earth from an orbiting satellite.

It will be understood that the radiation scanner and the support for a radiation scanning element have been described and disclosed herein for purposes of illustration and explanation and are not intended to indicate the limits of the present invention, the scope of which is defined by the following claims.

We claim:

1. In apparatus for scanning a radiation beam over a limited angular scanning pattern; a scanning element arranged to move said beam over said pattern in response to motion of said element; a support; means mounting said element on said support for limited pivotal movement about an axis; and drive means for imparting to said element initial movement in one rotational direction about said axis; said mounting means including resilient spring means to yieldably restrain initial pivotal movement of said element so that after initial motion is imparted to said element by said drive means in said one direction, said spring means oscillates said element about said axis; said mounting means further including at least one flexural pivot having a first portion fastened to said element, a second portion fastened to said support and rotatable relative to said first portion about said axis, said spring means being interconnected between said first and said second pivot portions, each of said pivot portions comprising a sleeve having a tubular end portion and an axial extension projecting outwardly from the tubular portion and being telescoped into the tubular portion of the other sleeve so that said sleeves are relatively rotatable about said axis; and said spring means comprising at least two flat springs extending diametrically across said sleeves with each spring being fastened at one end to one sleeve and at its other end to the other sleeve to support said sleeves on each other.

2. The apparatus set forth in claim 1 wherein said spring means comprises a first flat spring fastened at one end to said extension of one sleeve and at its other end to said tubular portion of the other sleeve to extend diametrically of said sleeves in one direction, a second flat spring fastened at one end to the extension of the other sleeve and at its other end to the tubular portion of said one sleeve to extend diametrically of said sleeves in said one direction in parallel relation to said first spring and a third flat spring fastened at one end to said one sleeve and at its other end to said other sleeve to extend diametrically of said sleeves in a direction perpendicular to said first and said second springs so that one pivot portion is floating with respect to the other pivot portion and said one pivot portion is free to rotate about said axis against the spring action of said first, second, and third springs without sliding or rolling friction.

3. An apparatus for scanning an area comprising:
a scanning element;
a support for said scanning element;
means pivotally mounting said scanning element on said support including two sleeves each having an extension mating with the other sleeve, one of said sleeves being mounted on said support and the other of said sleeves being mounted on said scanning element, and spring means suspending said other sleeve from said one sleeve to permit pivotal movement of said scanning element relative to said support, said spring means being constructed and arranged to alternately store and release energy for oscillatory driving of said scanning element; and
drive means to move said scanning element in one direction and to impart energy to said spring means.

4. The combination according to claim 3 including cooperating abutment means on each sleeve to restrict the movement of said scanning element within defined limits.

5. Apparatus for scanning an area comprising:
a scanning element;
a support for the said scanning element;
means mounting said scanning element on said support for movement in an arc, said mounting means including means pivotally mounting said scanning element on said support including a first mounting member on said support, a second mounting member on said scanning element, and spring means suspending said second mounting member from said first mounting member to permit pivotal movement of said second member relative to said first member, said spring means alternately storing and releasing energy for oscillatory driving of said scanning element; and
drive means to move said scanning element including a motion imparting member and a flexible member coupling said motion imparting member and said scanning element to transfer motion from said motion imparting member to said scanning element and to permit relative motion therebetween.

References Cited

UNITED STATES PATENTS

| | | | |
|---|---|---|---|
| 3,087,373 | 4/1963 | Poor et al. | 250—230 |
| 3,234,844 | 2/1966 | Fain et al. | 250—235 X |
| 2,945,229 | 7/1960 | Klauser | 343—754 |

JAMES W. LAWRENCE, Primary Examiner

V. LAFRANCHI, Assistant Examiner

U.S. Cl. X.R.

250—235; 267—1; 343—763